3,422,003
ISOTHERMAL MOLECULAR SIEVE HYDRO-
CARBON SEPARATION PROCESS
Roger Hilary Anstey, Blackwater, and Robert Marshall
Macnab, Richmond, England, assignors to The British
Petroleum Company Limited, London, England, a corporation of England
No Drawing. Filed Dec. 15, 1964, Ser. No. 418,536
Claims priority, application Great Britain, Jan. 1, 1964,
52/64; July 20, 1964, 29,465/64
U.S. Cl. 208—310
Int. Cl. C10g 25/00
14 Claims

ABSTRACT OF THE DISCLOSURE

Straight chain hydrocarbons are separated from $C_4$—450° C. hydrocarbon mixtures by adsorption on a fixed 5 A. molecular sieve bed in a first stage. The bed is purged in a second stage to remove surface held and interstitially held material, and the straight chain hydrocarbons are desorbed in a third stage. All three stages are operated isothermally in the vapour phase. Purging and desorption are effected by pressure variation alone.

---

This invention relates to the separation of hydrocarbon mixtures and particularly to the separation of straight chain hydrocarbons from mixtures of the same with branched chain and/or cyclic hydrocarbons using molecular sieves.

It is well-known that certain natural and synthetic zeolites have the property of preferentially adsorbing certain types of hydrocarbons. These zeolites, known as molecular sieves, have crystalline structures containing a large number of pores of uniform size. In different zeolites these pores may be from 4 A. to 15 A. in diameter, but in any one zeolite the pores will be of substantially uniform size.

It has previously been proposed to treat hydrocarbon mixtures with molecular sieves. It has been proposed to treat petroleum fractions ranging from gasoline to gas-oils and higher with molecular sieves having pore diameters ranging from 4 A. to 15 A. In order to separate straight chain hydrocarbons from branched chain and/or cyclic hydrocarbons a molecular sieve having pore diameters of 5 A. is suitable. Such a process may be used to recover a denormalised fraction, for example gasoline of higher octane number due to the removal of low octane normal paraffins. The absorbed straight chain material may also be recovered if required.

According to the present invention a process for separating straight-chain hydrocarbons from mixtures of the same with branched-chain and/or cyclic hydrocarbons, the mixtures boiling within the range $C_4$—450° C., for example 150–300° C., comprises contacting the mixture with a fixed bed of 5 A. molecular sieve in a first stage selectively to absorb the straight-chain hydrocarbons, purging the sieve bed in a second stage to remove surface-adsorbed and interstitially-held hydrocarbons from the sieve bed, and desorbing the absorbed straight-chain hydrocarbons in a third stage, all three stages being conducted isothermally in the vapour phase, purging and desorption being effected by pressure variation alone.

The process temperature preferably lies within the range 300–450° C., and particularly preferred temperatures for different range feedstocks are 325–375° C. for gasoline, 350–400° C. for kerosine, and 380–420° C. for gas oil. In the present specification the terms gasoline, kerosine, and gas oil have their normal meanings as used in the petroleum industry, i.e. they refer respectively to fractions boiling substantially within the ranges $C_4$—200° C., 150–300° C., and 200–450° C.

Purging may be effected by reducing the pressure in the purging stage to an intermediate level below that of the absorption stage, desorption being subsequently conducted by lowering the pressure in the desorption stage to a still lower level. The absorption stage is desirably operated at a maximum pressure of 3–150 p.s.i.a., the preferred pressure again varying with feedstock being 40–100 p.s.i.a. for gasoline, 15–35 p.s.i.a. for kerosine, and 5–30 p.s.i.a. for gas oil. The intermediate purge pressure may be within the range 0.1–25 p.s.i.a., the preferred pressure also depending upon the actual boiling range of the feedstock. For example, when treating a gasoline fraction of average carbon number about $C_7$ boiling in the range $C_4$—180° C. a purge pressure range of 2–10 p.s.i.a. is preferred, while 1.0–3.0 p.s.i.a. is preferred for kerosine range fractions of average carbon number about $C_{11}$ boiling between 150–250° C., and 0.1–1.0 p.s.i.a. for gas oil fractions and higher boiling fractions ranging between 200–450° C. Similarly the desorption pressure is within the range 0.05–2.0 p.s.i.a., the preferred pressure varying according to the feedstock boiling range being preferably 0.2–2.0 p.s.i.a. for gasoline, 0.1–0.3 p.s.i.a. for kerosine and 0.05–0.3 p.s.i.a. for gas oil fractions.

The durations of the three stages may be such that the desorption plus purge duration is a simple multiple of the absorption duration. Alternatively, and preferably, however, the durations of the absorption and desorption are single multiples of the purge. The purge duration should not exceed 3 minutes, 1–2 minutes being preferred. The absorption and desorption periods may be, respectively, 1–5 preferably 1–2 minutes and 2–10 preferably 3–8 minutes.

The process is preferably operated using a number of fixed beds of sieve so that at any given time, one or more beds are absorbing, purging and desorbing. The ratio of the numbers of beds respectively, absorbing, purging and desorbing at any given moment is preferably the preferably the same as the ratio of the durations of the absorption, purge and desorption stages. This ratio may be $1:1:n$ where $n$ is an integer between 1 and 6, 1:1:3 being preferred. Thus, for example, with a ratio of 1:1:3, a total of 5 sieve beds is required. A further additional bed may also be provided to permit periodic regeneration, e.g. by burning off, to remove carbonaceous deposits without interrupting the absorption-purge-desorption cycle.

The feed rate to the absorption stage is preferably 0.5–2.5 v./v./hr., particularly 1.0–2.0 v./v./hr.

According to a further preferred feature of the present invention, evacuation of the sieve bed during the desorption stage is conducted at least from both ends of the bed. By desorbing from both ends of the bed simultaneously in this manner as opposed to one end only, the yield of product can be increased considerably. It is believed that the main criterion determining product yield is the mean vapour pressure existing in the bed at the end of the desorption stage. Moderate increases in bed resistance, i.e. pressure drop along the bed, will limit the rate of desorption. Rates of desorption are proportional to the differential pressure existing inside and outside the sieve pore. By desorbing from both ends of the bed the mean path of desorbed molecules traversing the bed is effectively halved and the mean pressure reduced and so rates of desorption will be higher and hence yields will be increased. In addition to evacuating from both ends, evacuation can be conducted also from intermediate positions along the bed, thereby further reducing the effective bed length. The effective bed length is preferably 1–15 feet especially 3–8 feet.

The direction of purging is also important. When processing gasoline range feedstocks purging should preferably be carried out in a direction co-current to that of the feed during the absorption stage. Similarly when processing kerosine range feedstocks purging should preferably be in a co-current direction. When processing gas oil range feedstocks however, it is not always possible to attain satisfactory product purity using co-current purging alone in which case simultaneous co- and counter-current purging is preferred. It is believed that an essential feature of the purging process is that a small amount of normal paraffins should be desorbed from within the sieve to displace non-normal material from the void spaces and from the surface of the sieve. In the case of gasoline and kerosine range normal paraffins some desorption of n-paraffins takes place at pressures above the recommended purge pressure therefore this displacement is relatively easy.

Further, the non-absorbed n-paraffins at the inlet end of the bed at the end of the absorption stage are absorbed at the unsaturated outlet end of the bed during the first part of a co-current purge, whereas with a counter-current, and to a lesser extent with a co- and counter-current purge, these would pass straight out of the bed again. The yield and extraction efficiency of the process are therefore increased using a co-current purge. With gas oil range feedstocks however very little desorption of n-paraffins takes place until very low pressures are attained and therefore it is important that, as in the desorption stage, the mean vapour pressure throughout the bed should be relatively low by the end of the purge stage. Where simultaneous co- and counter-current purging is found necessary the valve on the purging system at the feed inlet end of the bed may usefully be opened after the valve on the purging system at the feed outlet end of the bed. In this way the feed hold-up material at the feed inlet end of the bed referred to above, is passed over the bed allowing the normal paraffins present in this hold-up material to be absorbed in the unsaturated outlet end of the bed.

Acording to a yet further feature of the present invention, the effluent recovered from the purge stage is recycled to the feed to the absorption stage. The purge stage effluent invariably contains a proportion of straight-chain hydrocarbons which have been desorbed during purging. By recycling this effluent an increase in straight-chain product can be obtained. Alternately the same yield can be obtained at a higher extraction efficiency by reducing the flow of fresh feedstock in proportion to the straight-chain hydrocarbon content of the purge effluent.

The invention is illustrated with reference to the following examples:

Example 1

An autofined kerosine of Middle East origin containing 25.6% weight of n-paraffins in the $C_{10}-C_{15}$ range was processed under the cyclic conditions given in Table 1 below:

TABLE 1

| Stage | Duration, min. | Temperature, °C. | Pressure, p.s.i.a. | Feed rate, v./v./hr. |
| --- | --- | --- | --- | --- |
| Absorption | 4 | | 0.1→27 | 0.5 |
| Purge | 1½ | 380 | 27→1.5 | |
| Desorption | 6½ | | 1.5→0.1 | |

Purging was carried out simultaneously from both ends of the sieve bed, desorption being conducted only from the end opposite to that at which feed was introduced. The n-paraffin yield was 3.0% sieve weight/hour with a purity of 97.5% weight and a carbon number distribution substantially the same as the feed.

By desorbing from both ends of the bed simultaneously, the n-paraffin yield was increased to 3.5% sieve weight/hour.

Example 2

A hydrofined kerosine feedstock of Middle East origin containing 22% weight n-paraffins in the $C_9-C_{14}$ range was treated under the conditions indicated in Table 2 below:

TABLE 2

| Stage | Duration, min. | Temperature, °C. | Pressure, p.s.i.a. | Feed rate, v./v./hr. |
| --- | --- | --- | --- | --- |
| Absorption | 1½ | | 0.2→25 | 1.5 |
| Purge | 1½ | 380 | 25→1.5 | |
| Desorption | 4½ | | 1.5→0.2 | |

Purging was carried out from the end opposite to that at which feed was introduced and desorption was carried out from both ends of the sieve bed simultaneously. The n-paraffin yield was 5.8% sieve weight/hour with a purity of >97% weight and at an extraction efficiency of 77% weight.

By recycling the purge stage effluent to the feedstock and reducing the fresh feed rate to 1.3 v./v./hr., the same yield of n-paraffins (5.8% sieve weigh/hour) was obtained at an extraction efficiency of 89% weight.

Example 3

A hydrofined gas oil feedstock of Middle East origin containing 22% n-paraffins boiling in the range of 209°–299° C., and of carbon number range $C_{13}-C_{18}$ was treated under the conditions indicated in Table 3 below:

TABLE 3

| Stage | Duration, min. | Temperature, °C. | Pressure | Feed rate, LHSV |
| --- | --- | --- | --- | --- |
| Absorption | 1½ | | 2 p.s.i.a. | 1.33 |
| Purge | 1 | 400 | 30 mm. Hg | |
| Desorption | 4½ | | 5 mm. Hg | |

Purging and desorption were carried out in each case by pressure reduction from both ends of the sieve bed simultaneously. The n-paraffin yield was 4.3% sieve weight/hour with a purity of 97.7% weight and an extraction efficiency of 59% weight. This extraction efficiency could be improved by reducing the fresh feed rate and recycling the purge stage effluent.

Example 4

A catalytic reformer feedstock of Middle East origin containing 31.7% wt. n-paraffin in the range of $C_6-C_9$ was treated under the conditions indicated in Table 4 below:

TABLE 4

| Stage | Duration, min. | Temperature, °C. | Pressure | Feed rate, LHSV |
| --- | --- | --- | --- | --- |
| Absorption | 2 | | 30 p.s.i.g | *1.8 |
| Purge | 1½ | 350 | 200 mm. Hg | |
| Desorption | 4½ | | 15 mm. Hg | |

*Plus purge recycle.

Purging was carried out in a co-current direction. Desorption was carried out in a co- and counter-current direction.

The n-paraffin yield was 12.6% s.w./hour of 99.2% purity and extraction efficiency 85% wt.

We claim:
1. A process for separating straight-chain hydrocarbons from mixtures of the same with hydrocarbons selected from the group consisting of branched chain hydrocarbons, cyclic hydrocarbons and mixtures of the foregoing, the mixtures boiling within the range $C_4$—450° C. and selected from the group consisting of gasoline, kerosene and gas oil comprising contacting the mixture with a fixed bed of 5 A. molecular sieve in a first stage to selectively absorb the straight-chain hydrocarbons, purging the sieve bed to remove substantially only surface-adsorbed and interstitially held hydrocarbons from the sieve bed and desorbing the absorbed straight-chain hydrocarbons in a third stage, all three stages being conducted isothermally in the vapour phase, purging being effected by reducing the pressure in the purging stage to an intermediate level below that of the absorption stage and the desorption being subsequently conducted by lowering the pressure in the desorption stage to a still lower level than in the purging stage, the absorption stage pressure lying within the range 40–100 p.s.i.a., the purge stage pressure lying within the range 2–10 p.s.i.a., and the desorption stage pressure lying within the range 0.2–2.0 p.s.i.a. when the feedstock is gasoline; the absorption stage pressure lying within the range 15–35 p.s.i.a., the purge stage pressure lying within the range 1.0–3.0 p.s.i.a. and the desorption stage pressure lying within the range 0.1–0.3 p.s.i.a when the feedstock is kerosene; and, the absorption stage pressure lying within the range 5–30 p.s.i.a., the purge stage pressure lying within the range 0.1–1.0 p.s.i.a. and the desorption stage pressure lying within the range 0.05–0.3 p.s.i.a. when the feedstock is gas oil.

2. A process as claimed in claim 1 wherein the temperature employed lies within the range 300–450° C.

3. A process as claimed in claim 1 wherein the desorption plus purge duration is a simple multiple of the absorption duration.

4. A process as claimed in claim 1 wherein the durations of the absorption and desorption are simple multiples of the purge.

5. A process as claimed in claim 1 wherein the purge duration is not more than 3 minutes.

6. A process as claimed in claim 1 wherein the absorption and desorption periods are, respectively, 1–5 minutes and 2–10 minutes.

7. A process as claimed in claim 1 wherein the ratio of the numbers of sieve beds respectively absorbing, purging and desorbing at any given moment is the same as the duration of the absorption, purge and desorption stages.

8. A process as claimed in claim 7 wherein the said ratio is $1:1:n$ where $n$ is an integer between 1 and 6.

9. A process as claimed in claim 1 wherein the feed rate to the absorption stage is 0.5–2.5 v./v./hr.

10. A process as claimed in claim 1 wherein desorption is conducted at least from both ends of the bed simultaneously.

11. A process as claimed in claim 1 wherein the effective sieve bed length during desorption is 1–15 feet.

12. A process as claimed in claim 1 wherein purging is carried out in a direction co-current to that of the feed during the absorption stage.

13. A process as claimed in claim 1 wherein purging is carried out simultaneously co- and counter-currently to the feed direction.

14. A process as claimed in claim 1 wherein the purge stage effluent is recycled to the feed to the absorption stage.

References Cited

UNITED STATES PATENTS 2,901,519   8/1959   Patterson et al. _____ 260—676
3,201,490   8/1965   Lacey et al. _____ 260—676

HERBERT LEVINE, *Primary Examiner.*

U.S. Cl. X.R.

260—676